US011590664B2

(12) United States Patent
Nakayama (10) Patent No.: US 11,590,664 B2
(45) Date of Patent: Feb. 28, 2023

(54) ROBOT SYSTEM

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 257 days.

(21) Appl. No.: 16/287,061

(22) Filed: Feb. 27, 2019

(65) Prior Publication Data

US 2019/0299420 A1 Oct. 3, 2019

(30) Foreign Application Priority Data

Mar. 29, 2018 (JP) .............................. JP2018-063633

(51) Int. Cl.
*B25J 18/00* (2006.01)
*B25J 19/00* (2006.01)
(Continued)

(52) U.S. Cl.
CPC ............. *B25J 13/06* (2013.01); *B25J 13/006* (2013.01); *B25J 18/00* (2013.01); *B25J 19/00* (2013.01); *F21S 4/22* (2016.01)

(58) Field of Classification Search
CPC ........ F21S 4/22; F21S 4/24; F21S 4/00; F21S 4/26; F21S 2/00; F21S 4/20; B25J 18/00;
(Continued)

(56) References Cited

U.S. PATENT DOCUMENTS 6,193,385 B1 * 2/2001 Maki ....................... E01F 9/615
362/108
6,210,016 B1 * 4/2001 Prineppi ................. F21V 19/04
362/233
(Continued)

FOREIGN PATENT DOCUMENTS

CN 106945007 A 7/2017
EP 1566246 A1 8/2005
(Continued)

OTHER PUBLICATIONS

IDEC Corporation; "Table of Color of Indicator Light" from"Group safety standard IEC 60204-1"; [online] URL; http://jp.idec.com/ja/solution/msafety/law/iso-iec/iec60204.html; 2 pages including Machine-generated English-language translation.
(Continued)

*Primary Examiner* — Daniel I Walsh
(74) *Attorney, Agent, or Firm* — Maier & Maier, PLLC (57) ABSTRACT

Provided is a robot system which includes: a robot; a controller controlling the robot and causing the robot to operate in a plurality of operation modes; and a display device attached on the robot and caused by the controller to operate in patterns in accordance with the operation modes, the patterns being different from one another. The display device includes: a sheet-like base part being deformable in a shape in accordance with an outer surface of the robot and having flexibility; one or more display parts fixed on the base part; and a fixture maintaining the base part in a state in which the base part is attached on the outer surface of the robot.

12 Claims, 11 Drawing Sheets

(51) Int. Cl.
   *F21S 4/22* (2016.01)
   *B25J 13/06* (2006.01)
   *B25J 13/00* (2006.01)
(58) Field of Classification Search
   CPC ........ B25J 18/007; B25J 13/06; B25J 13/006; B25J 19/00
   See application file for complete search history.

(56) References Cited

U.S. PATENT DOCUMENTS

| | | | | |
|---|---|---|---|---|
| 7,156,537 | B1* | 1/2007 | Cohrs | F21S 4/20 362/147 |
| 8,262,250 | B2* | 9/2012 | Li | F21S 4/24 362/249.02 |
| 8,360,608 | B2* | 1/2013 | Wildner | F21V 5/045 362/249.04 |
| 8,364,312 | B2* | 1/2013 | Tobey | B25J 18/06 700/258 |
| 8,398,288 | B1* | 3/2013 | Lin | G02B 6/0085 362/613 |
| 8,714,772 | B1* | 5/2014 | Levante | H01R 12/81 362/249.02 |
| 9,031,696 | B2* | 5/2015 | Nakahara | B25J 9/1697 700/259 |
| 9,157,200 | B2 | 10/2015 | Lumsden | F21S 4/20 |
| 9,288,836 | B1 | 3/2016 | Clement | A44C 5/105 |
| 9,647,349 | B1* | 5/2017 | Stillman | H01R 4/2433 |
| 10,022,555 | B2* | 7/2018 | Tapper | A61N 5/0616 |
| 10,060,857 | B1* | 8/2018 | Bouchard | B25J 9/0096 |
| 10,265,872 | B2* | 4/2019 | Wagner | B25J 9/1676 |
| 10,317,023 | B2* | 6/2019 | Li | B29C 48/17 |
| 10,582,616 | B1* | 3/2020 | Chen | H01L 33/62 |
| 10,661,453 | B2* | 5/2020 | Koenig | G16H 40/63 |
| 10,935,221 | B1* | 3/2021 | Tirosh | F21S 9/02 |
| 2002/0080012 | A1* | 6/2002 | Broderick | A44C 5/0007 340/331 |
| 2005/0187657 | A1* | 8/2005 | Hashimoto | B25J 19/00 700/245 |
| 2006/0086888 | A1* | 4/2006 | Eash | F21V 23/0442 250/206 |
| 2007/0291473 | A1* | 12/2007 | Traynor | G09F 21/02 362/225 |
| 2008/0137332 | A1* | 6/2008 | Lo | F21S 4/24 362/240 |
| 2008/0285264 | A1* | 11/2008 | Whitehouse | F21V 17/005 362/217.05 |
| 2009/0109660 | A1* | 4/2009 | Dutcher | A45D 8/28 362/103 |
| 2009/0154156 | A1 | 6/2009 | Lo et al. | |
| 2010/0008090 | A1* | 1/2010 | Li | F21V 23/06 362/249.02 |
| 2010/0097791 | A1* | 4/2010 | Chang | A42B 1/244 362/235 |
| 2010/0115811 | A1* | 5/2010 | Koper | G09F 13/22 40/546 |
| 2010/0164409 | A1 | 7/2010 | Lo et al. | |
| 2010/0214776 | A1* | 8/2010 | Franceschelli | F21S 43/14 362/231 |
| 2011/0297970 | A1 | 12/2011 | Lo et al. | |
| 2011/0305011 | A1 | 12/2011 | Lo et al. | |
| 2011/0310595 | A1* | 12/2011 | Hardesty | E04F 15/02166 362/153 |
| 2012/0201104 | A1* | 8/2012 | Amenduni Gresele | A44C 5/0015 368/239 |
| 2012/0281413 | A1* | 11/2012 | Lewis | A01G 7/045 362/249.11 |
| 2012/0326634 | A1 | 12/2012 | Li | |
| 2014/0016298 | A1* | 1/2014 | Lind | F21S 4/20 362/23.14 |
| 2014/0063790 | A1* | 3/2014 | Gold | A42B 3/044 362/106 |
| 2014/0085896 | A1* | 3/2014 | Li | F21S 4/24 362/249.06 |
| 2014/0241006 | A1* | 8/2014 | Licatovich | G02B 6/0011 362/612 |
| 2014/0268793 | A1* | 9/2014 | LaRose | F21V 17/04 359/887 |
| 2014/0277298 | A1* | 9/2014 | Tapper | A61N 5/0616 607/91 |
| 2014/0313722 | A1* | 10/2014 | Eloff | F21S 4/22 362/418 |
| 2014/0334142 | A1* | 11/2014 | Levante | F21V 23/06 362/222 |
| 2015/0051026 | A1* | 2/2015 | Halliburton | A63B 71/0669 473/480 |
| 2015/0109767 | A1* | 4/2015 | Fang | F21V 33/008 362/158 |
| 2015/0241034 | A1* | 8/2015 | Dankelmann | H05K 1/189 29/592.1 |
| 2015/0330584 | A1* | 11/2015 | Bobbo | F21K 9/20 362/220 |
| 2015/0352720 | A1* | 12/2015 | Iizuka | B25J 9/1664 700/245 |
| 2016/0031078 | A1 | 2/2016 | Kapoor et al. | |
| 2016/0032545 | A1* | 2/2016 | Lumsden | B61L 29/04 404/6 |
| 2016/0052135 | A1 | 2/2016 | Motoyoshi et al. | |
| 2016/0107706 | A1* | 4/2016 | McCormack | B60Q 3/30 296/182.1 |
| 2016/0111029 | A1* | 4/2016 | Hermes, III | G09F 13/22 40/544 |
| 2016/0129594 | A1* | 5/2016 | Telling | B25J 9/161 700/255 |
| 2016/0158639 | A1* | 6/2016 | Cantrell | G09F 3/005 340/815.4 |
| 2016/0223149 | A1* | 8/2016 | Gerpheide | H05B 47/19 |
| 2017/0006414 | A1* | 1/2017 | Tomassini | H04W 4/80 |
| 2017/0045187 | A1* | 2/2017 | Li | B29C 48/0022 |
| 2017/0085688 | A1* | 3/2017 | Zhou | G06F 3/011 |
| 2017/0097133 | A1* | 4/2017 | Lee | F21S 41/24 |
| 2017/0122507 | A1* | 5/2017 | Hoffman | H05B 47/18 |
| 2017/0266077 | A1* | 9/2017 | Mackin | A61G 13/1235 |
| 2018/0133060 | A1* | 5/2018 | Patel | F21V 23/0464 |
| 2018/0259142 | A1* | 9/2018 | Eddins | F21S 8/033 |
| 2018/0284881 | A1* | 10/2018 | Briggs | A63G 21/12 |
| 2018/0333856 | A1 | 11/2018 | Iizuka | |
| 2019/0000601 | A1* | 1/2019 | Huang | A61C 1/0015 |
| 2019/0234568 | A1* | 8/2019 | Doll | F21K 9/20 |
| 2019/0268518 | A1* | 8/2019 | Howard | F21V 17/108 |
| 2019/0394547 | A1* | 12/2019 | Lemons | G10L 15/28 |
| 2020/0025343 | A1* | 1/2020 | Labas | F21S 4/22 |
| 2020/0032972 | A1* | 1/2020 | Wells | F21V 31/005 |
| 2020/0124242 | A1* | 4/2020 | Creusen | F21S 4/24 |
| 2020/0170095 | A1* | 5/2020 | Stimac | H05B 45/20 |
| 2020/0223075 | A1* | 7/2020 | Wagner | B25J 19/06 |
| 2020/0268557 | A1* | 8/2020 | Farrow | A61F 13/00059 |
| 2021/0019994 | A1* | 1/2021 | Drennan | G07F 17/3211 |
| 2021/0023434 | A1* | 1/2021 | Holland | A63B 71/03 |
| 2021/0140624 | A1* | 5/2021 | Schluer | F21V 23/005 |
| 2021/0148521 | A1* | 5/2021 | Jiang | F21V 29/83 |
| 2021/0237355 | A1* | 8/2021 | Cambron | C12N 5/0062 |
| 2021/0270431 | A1* | 9/2021 | John | F21V 23/06 |
| 2021/0378781 | A1* | 12/2021 | Schmitt | A61B 90/92 |
| 2022/0125672 | A1* | 4/2022 | Wersland | A61F 7/007 |
| 2022/0174881 | A1* | 6/2022 | Tompkin | A01G 9/023 |
| 2022/0361972 | A1* | 11/2022 | Armand | A61B 34/76 |

FOREIGN PATENT DOCUMENTS

| | | |
|---|---|---|
| EP | 2965874 A2 | 1/2016 |
| EP | 2 990 165 A2 | 3/2016 |
| JP | S59-097892 A | 6/1984 |
| JP | S61-175703 A | 8/1986 |
| JP | H01-016902 A | 1/1989 |
| JP | 2001-202803 A | 7/2001 |
| JP | 2005-231010 A | 9/2005 |
| JP | 2006-147324 A | 6/2006 |
| JP | 2007061940 A | 3/2007 |

(56) References Cited

FOREIGN PATENT DOCUMENTS

| | | |
|---|---|---|
| JP | 2009-012125 A | 1/2009 |
| JP | 2009-178820 A | 8/2009 |
| JP | 2009-528685 A | 8/2009 |
| JP | 2011-084838 A | 4/2011 |
| JP | 2011-240459 A | 12/2011 |
| JP | 2014-008071 A | 1/2014 |
| JP | 2015-231651 A | 12/2015 |
| JP | 2016-043438 A | 4/2016 |
| JP | 2016-043457 A | 4/2016 |
| JP | 2017-016870 A | 1/2017 |
| WO | 2008/031580 A1 | 3/2008 |

OTHER PUBLICATIONS

Office Action dated Mar. 31, 2020, in corresponding Japanese Application No. 2018-063633; 9 pages.
Search Report dated Mar. 18, 2020, in corresponding Japanese Application No. 2018-063633; 29 pages.

\* cited by examiner

ROBOT SYSTEM

CROSS-REFERENCE TO RELATED APPLICATIONS

This application claims the benefit of Japanese Patent Application No. 2018-063633, the content of which is incorporated herein by reference.

FIELD

The present invention relates to a robot system.

BACKGROUND

A robot which includes a display device incorporated into a movable part to display an operating state of the movable part has been known (for example, Japanese Unexamined Patent Application, Publication No. 2016-043457). As the display device, a ring light including LEDs arranged in positions surrounding the whole circumference of an end effector as the movable part is shown therein.

SUMMARY

One aspect of the present invention is a robot system which includes: a robot; a controller controlling the robot and causing the robot to operate in a plurality of operation modes; and a display device attached on the robot and caused to operate in patterns in accordance with the operation modes by the controller, the patterns being different from one another. In the robot system, the display device includes: a sheet-like base part being deformable in a shape in accordance with an outer surface of the robot and having flexibility; one or more display parts fixed on the base part; and a fixture maintaining the base part in a state in which the base part is attached on the outer surface of the robot.

DETAILED DESCRIPTION

Hereinafter, a robot system 1 according to one embodiment of the present invention will be described with reference to the accompanying drawings.

Figure 1:
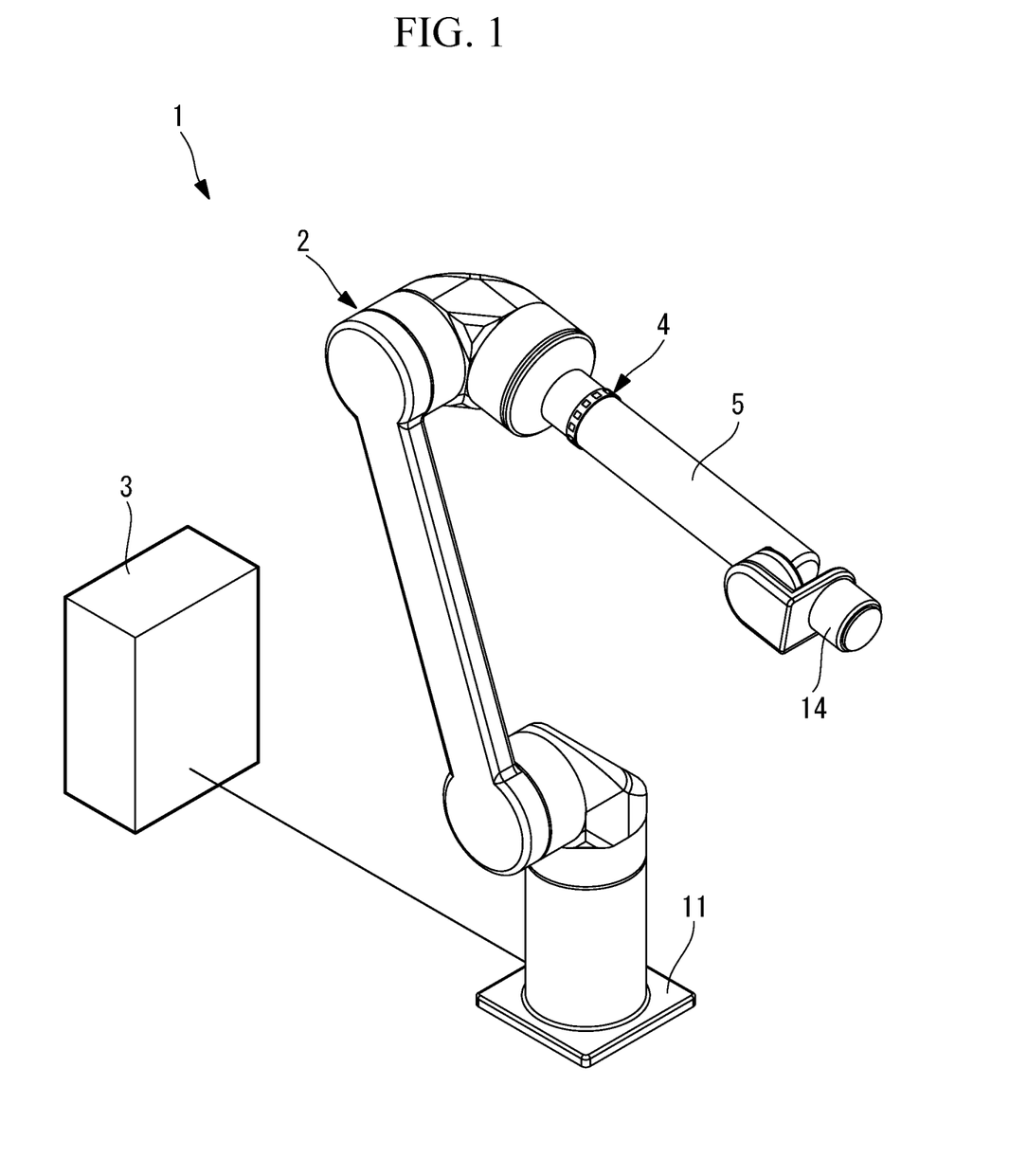
FIG. 1 is an overall configuration view showing a robot system according to one embodiment of the present invention.

As shown in FIG. 1, the robot system 1 according to the present embodiment includes a robot 2, a controller 3 controlling the robot 2, and a display device 4 attached on the robot 2.

Although the robot 2 may have any structure, in an example shown in FIG. 1, the robot 2 is a 6-axis articulated robot. In the present embodiment, a collaborative robot which operates in the same work area shared by the robot and a human will be cited as an example and described.

The robot 2 is controller by the controller 3 in nine operation modes of, for example, an automatic operation mode, a collaborative operation mode, a normal teaching (online teach) mode, a direct teaching (direct teach) translational high speed motion mode, a direct teaching (direct teach) translational low speed motion mode, a direct teaching (direct teach) each axis rotation high speed motion mode, a direct teaching (direct teach) each axis rotation low speed motion mode, a teach playback confirmation mode, and a stop mode. These operation modes and operation patterns are merely one example, and there may be other operation modes and operation patterns and there may be no other operation modes and no operation patterns.

The automatic operation mode is a mode in which the robot 2 is operated to continuously perform a previously programmed motion at a maximum speed. When a worker collaborating with the robot 2 does not approach a motion range of the robot 2, this operation mode is kept.

The collaborative operation mode is a mode which is performed, in the automatic operation mode, when it is detected by an area sensor or the like that the worker collaborating with the robot 2 has approached the motion range of the robot 2. In this collaborative operation mode, the robot 2 continuously operates by changing an operation speed to a low speed at which the worker is not injured even if the robot 2 should contact the worker.

The normal teaching (online teach) mode is a mode which is executed when teaching for the robot 2 is performed. In this mode, the worker operates a teach pendant and indirectly operates the robot 2, thereby performing teaching of teach points. In the normal teaching (online teach) mode, the worker can perform the teaching even from a remote place outside the motion range of the robot 2.

The direct teaching (direct teach) translational high speed motion mode is a mode which is executed when the teaching for the robot 2 is performed as in the normal teaching (online teach) mode. However, the worker directly exerts a force on the robot 2 and guides the robot 2, thereby performing the teaching of the teaching points (direct teach). Since the worker performs the teaching in close proximity to the robot 2 within the motion range of the robot 2, in this mode, a measure such as setting of a speed which never becomes to be equal to or greater than a predetermined speed is required. In this mode, a guiding operation speed can be increased only up to 50 mm/sec as a maximum speed and only a guiding operation in a translational motion can be performed. The translational motion is a motion in which a TCP (TOOL CENTER POINT) of the robot 2 linearly moves. In order for the TCP to linearly move, a rotation amount of each of the axes is controlled.

In the direct teaching (direct teach) translational low speed motion mode, a guiding operation speed can be increased only up to 10 mm/sec as a maximum speed, and only the guiding operation in the translational motion can be performed.

In the direct teaching (direct teach) each axis rotation high speed motion mode, a guiding operation speed can be increased only up to 20°/sec as a maximum speed of each of the axes, and only a guiding operation in a rotational motion can be performed for each of the axes.

In the direct teaching (direct teach) each axis rotation low speed motion mode, a guiding operation speed can be increased only up to 5°/sec as a maximum speed of each of the axes, and only the guiding operation in the rotational motion can be performed for each of the axes.

The teach playback confirmation mode is a robot operation mode upon motion confirmation after the teaching has been completed.

The stop mode is a mode in which the robot 2 has stopped due to emergency stop or the like, excitation of a servomotor is turned off, and the robot 2 cannot be operated unless a reset instruction is executed.

Figure 2:
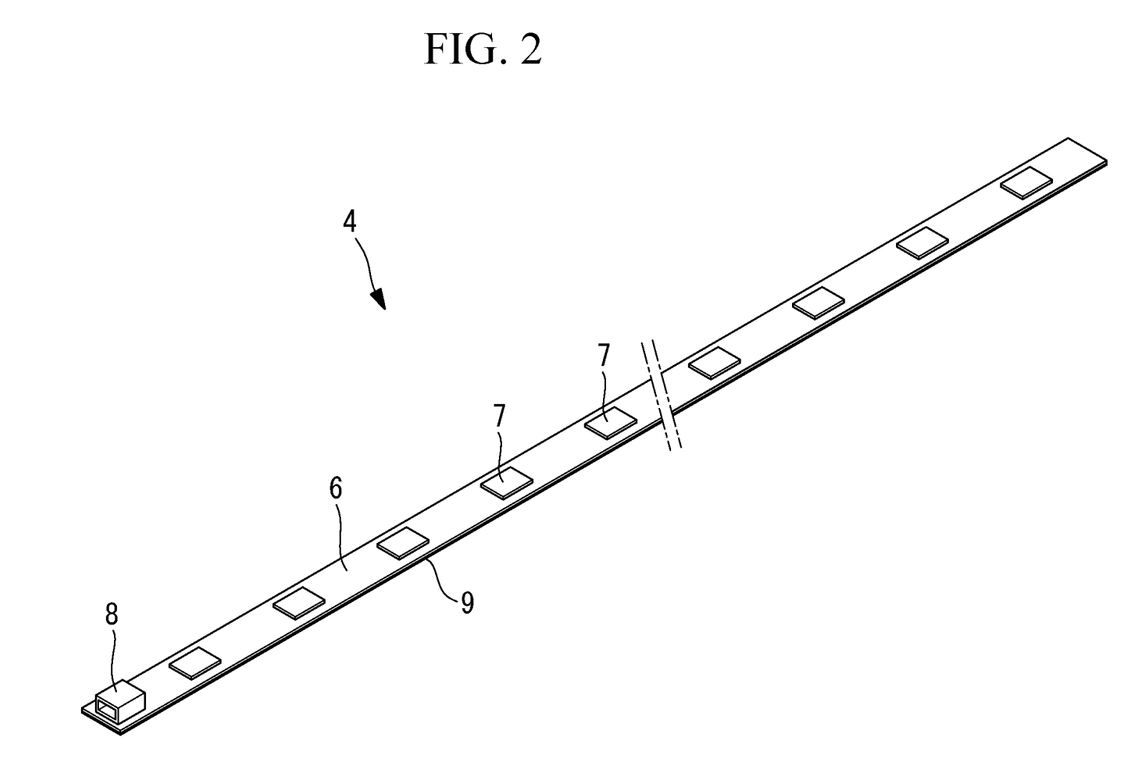
FIG. 2 is a perspective view showing one example of a display device included in the robot system shown in FIG. 1.

As shown in FIG. 2, the display device 4 is provided with a plurality of LED light sources (LEDs, light emitting parts, or display parts) 7 on one surface of a tape-shaped base part 6 having flexibility, which are arranged in a longitudinal direction of the base part 6 so as to be spaced apart from one another. On the base part 6, a connector 8 is fixed, and wiring (a cable) for supplying electric power, not shown, is connected between the connector 8 and the respective LED light sources 7. The base part 6 is, for example, a flexible printed board (FPC).

As shown in FIG. 2, for example, the base part 6 has such a length as to allow surrounding a forearm 5 of the robot 2 over the whole circumference thereof. On a surface of the base part 6 on which the LED light sources 7 are not arranged, an adhesive tape (an adhesive material or a fixture) 9 is provided.

Figure 3:
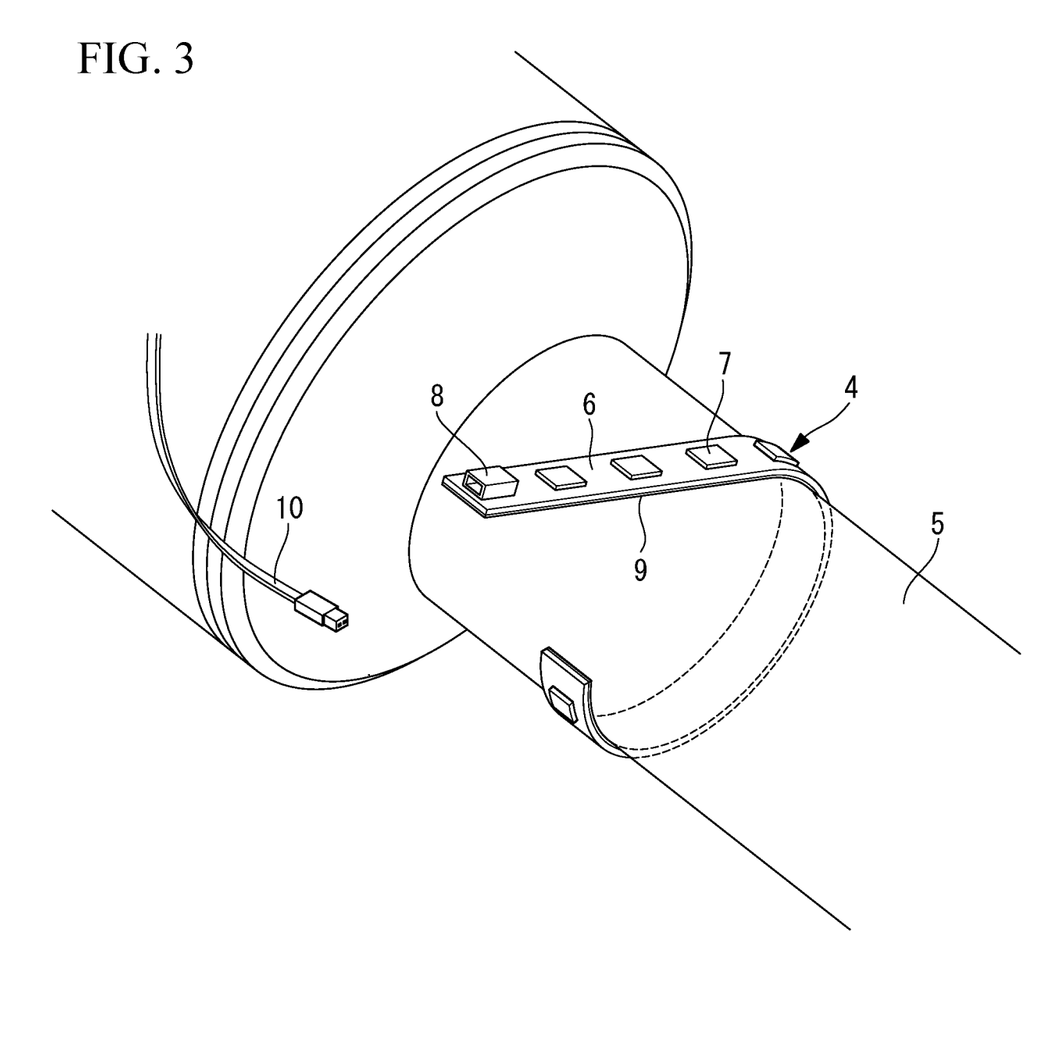
FIG. 3 is a partial perspective view illustrating operation of the display device shown in FIG. 2 which is wound on an outer surface of a forearm of a robot.
Figure 4:
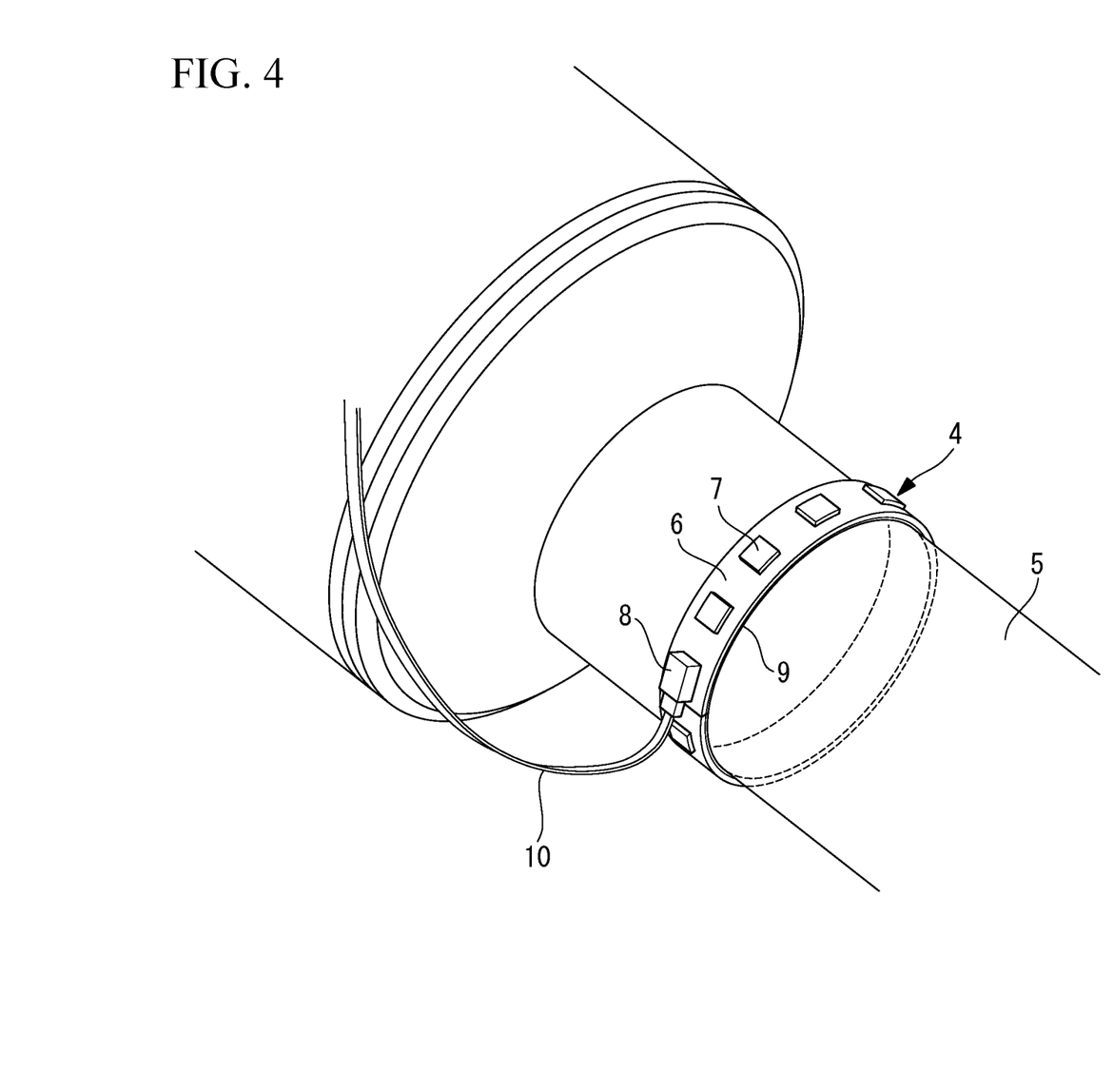
FIG. 4 is a partial perspective view showing a state in which the display device is fixed in a state in which the display device is wound on the outer surface of the forearm of the robot as shown in FIG. 3 and a state in which a cable is connected.

By curving the base part 6 in any position in a longitudinal direction of the forearm 5 of the robot 2 as shown in FIG. 3, the display device 4 is adhesively attached by the adhesive tape 9 in a position in which the whole circumference of an outer surface of the forearm 5 is surrounded by the display device 4, with the base part 6 coming along the outer surface of the forearm 5 as shown in FIG. 4. This attachment causes the plurality of LED light sources 7 provided for the display device 4 to be arranged over the whole circumference of the forearm 5 so as to be spaced apart from one another in a circumferential direction thereof.

The robot 2 is provided with a cable (not shown) for causing the robot 2 to operate or causing an electric-powered apparatus attached onto an end of the robot 2 to operate, with wiring of the cable provided from a base 11 of the robot 2 along an inner space or an outer surface of the robot 2. As shown in FIG. 4, the wiring of the cable 10 connecting to the LED light sources 7 is provided together with the wiring of the aforementioned cable and is detachably connected to the connector 8 fixed on the base part 6.

This causes the controller 3 and the display device 4 to be connected by the cable 10, and based on a signal from the controller 3, the LED light sources 7 are operated in operation patterns which are different from one another depending on the respective operation modes.

For example, in the automatic operation mode, the LED light sources 7 are caused to emit light in green, and the LED light sources 7 arranged in the circumferential direction are operated in an operation pattern in which the LED light sources 7 each alternately repeat lighting-up and lighting-off which are alternated at intervals of 2 seconds.

For example, in the collaborative operation mode, the LED light sources 7 are caused to emit light in green, and the LED light sources 7 arranged in the circumferential direction are operated in an operation pattern in which the LED light sources 7 each alternately repeat lighting-up and lighting-off which are alternated at intervals of 0.5 second.

For example, in the normal teaching (online teach) mode, the LED light sources 7 are caused to emit light in blue, and all of the LED light sources 7 are maintained in a lighting-up state.

For example, in the direct teaching (online teach) translational high speed motion mode, the LED light sources 7 are caused to emit light in blue, and the LED light sources 7 arranged in the circumferential direction are operated in an operation pattern in which the LED light sources 7 each alternately repeat lighting-up and lighting-off which are alternated at intervals of 0.5 seconds.

For example, in the direct teaching (direct teach) translational low speed motion mode, the LED light sources 7 are caused to emit light in blue, and the LED light sources 7 arranged in the circumferential direction are operated in an operation pattern in which the LED light sources 7 each alternately repeat lighting-up and lighting-off which are alternated at intervals of 1 second.

For example, in the direct teaching (direct teach) each axis rotation high speed motion mode, the LED light sources 7 are caused to emit light in blue, and the LED light sources 7 arranged in the circumferential direction are operated in an operation pattern in which there is a part at which only one among the LED light sources 7 is lit-off, the part moves to another part at which one thereamong neighboring to the lit-off one is lit-off, the movement is repeated at intervals of 0.5 second, and as a result, the lit-off part appears to periodically rotate around the forearm 5.

For example, in the direct teaching (direct teach) each axis rotation low speed motion mode, the LED light sources 7 are caused to emit light in blue, and the LED light sources 7 arranged in the circumferential direction are operated in an operation pattern in which there is a part at which only one among the LED light sources 7 is lit-off, the part moves to another part at which one thereamong neighboring to the lit-off one is lit-off, the movement is repeated at intervals of 1 second, and as a result, the lit-off part appears to periodically rotate around the forearm 5.

For example, in the teach playback confirmation mode, the LED light sources 7 are caused to emit light in white, and the LED light sources 7 arranged in the circumferential direction are operated in an operation pattern in which the LED light sources 7 each alternately repeat lighting-up and lighting-off which are alternated at intervals of 0.5 second.

For example, in the stop mode, the LED light sources 7 are caused to emit light in red, and all of the LED light sources 7 are maintained in a lighting-up state.

In addition, for example, during the teaching in the normal teaching (online teach) mode or the direct teaching (direct teach) translational high speed motion mode, when the robot 2 has approached a reaching limit area in the motion range, the LED light sources 7 are caused to emit light in blue, and the LED light sources 7 arranged in the circumferential direction are operated in an operation pattern in which the LED light sources 7 each alternately repeat lighting-up and lighting-off which are alternated at intervals of 0.2 seconds. When the robot 2 is moved in the same direction, because the robot 2 goes out of the motion range, the robot 2 becomes unable to move. The worker is informed that the robot 2 has become unable to move.

By the robot system 1 according to the present embodiment configured as described above, the display device 4 attached on the forearm 5 of the robot 2 is operated by the controller 3 in the operation patterns which are different from one another and are in accordance with the operation modes of the robot 2, thereby allowing the worker collaborating with the robot 2 to recognize each of the operation modes of the robot 2 from outside the robot 2.

In this case, in the present embodiment, since the base part 6 of the display device 4 is wound (attached) on the whole circumference of the outer surface of the forearm 5 in assembling the robot 2, the light emitted from the LED light sources 7 can be emitted evenly in all directions. This eliminates blind spots from the worker and allows the worker to confirm each of the operation modes of the robot 2 even when the worker is in any position with respect to the robot 2. In addition, there is an advantage in that even when the forearm 5 of the robot 2 is located in any posture, the worker can confirm each of the operation modes of the robot 2.

Furthermore, in the present embodiment, since merely by adhesively attaching the base part 6 by the adhesive tape 9 on the outer surface of the robot 2, the base part 6 is fixed thereon, exclusively designing components of the robot 2 for attaching the display device 4 is not required, thereby allowing cost to be remarkably reduced. In addition, since the display device 4 is merely attached from outside the robot 2, attachment and detachment are facilitated. Thus, a user selects any position, where the display device 4 is located, in accordance with positional relationship with other apparatuses and devices attached to the robot 2 or the like and can attach the display device 4.

In addition, maintenance upon occurrence of failure on the display device 4 is easy. That is, upon the occurrence of failure, merely by separating the cable 10 from the connector 8 fixed on the base part 6 and peeling off the adhesive tape 9, the display device 4 can be detached from the robot 2. Merely by winding and fixing a new display device 4 by the adhesive tape 9 and connecting the cable 10 to the connector 8, the display device 4 can be easily replaced.

Furthermore, since any machining or processing for the robot 2 is not required, there is also advantage that merely by attaching the display device 4 on the existing robot 2, a robot system 1 can be easily constructed.

In the robot system 1 according to the present embodiment, the display device 4 including the tape-shaped base part 6 is illustrated as an example. However, it is only required for the display device 4 to be a display device which can be curved in accordance with a shape of the outer surface of the robot 2, and instead of the above-described display device 4, a sheet-like display device having flexibility, which is of any shape, may be adopted. In addition, the display device 4 is wound in the circumferential direction of the forearm 5 of the robot 2. However, instead of this, the display device 4 may be adhesively attached to an outer surface of any component of the robot 2 such as an upper arm, an end effector, a rotating body, or the base 11.

Figure 5:
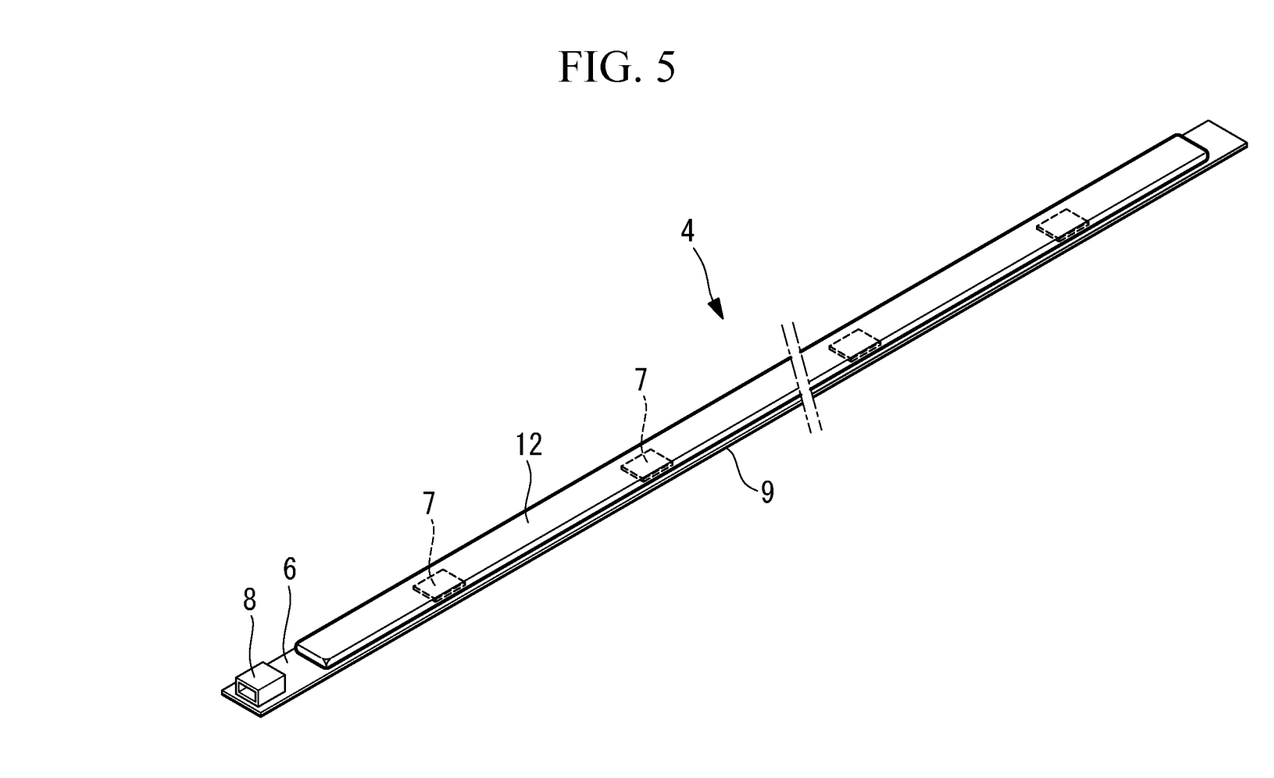
FIG. 5 is a perspective view showing a modified example of the display device shown in FIG. 2.

In addition, the plurality of LED light sources 7 are arranged in the longitudinal direction of the base part 6 so as to be spaced apart from one another. However, instead of this, it is only required that one or more LED light sources 7 are included. When the number of the LED light sources 7 is small, as shown in FIG. 5, a cover 12 configured of resin having a property of scattering light and having flexibility may be arranged in a position in which the LED light sources 7 are covered along the longitudinal direction of the base part 6. Since this causes light emitted from the LED light sources 7 to be guided while being scattered inside the cover 12, the worker with the LED light sources 7 in blind spots can easily visually recognize the light scattered by the cover 12. That is, there is an advantage in that the blind spots can be eliminated even by the small number of LED light sources 7.

As the cover 12, instead of the cover configured of the resin having the property of scattering the light and having the flexibility, a cover formed of a transparent elastic material which covers the plurality of LED light sources 7 arranged along the longitudinal direction of the base part 6 may be adopted. This can prevent the LED light sources 7 from being damaged due to contacting of the LED light sources 7 with an external object.

In addition, in the present embodiment, as the fixture for fixing the base part 6 on the outer surface of the robot 2, the adhesive tape 9 is adopted. However, instead of this, a fixing method may be adopted in which a lock mechanism such as a snap-fit part is provided for the tape-shaped base part 6 and the base part 6 is wound on outer circumference of the forearm 5, and thereafter, one part of the base part 6 is fixed on the base part 6 so that the base part 6 is bound on the outer circumference of the forearm 5 like a hose band.

In addition, the fixture may be configured by a cover 13 formed of an elastic material which transmits light emitted from the LED light sources 7. This allows the base part 6 to be fixed on the outer surface of the robot 2 by an elastic force of the cover 13.

For example, the cover 13 may be formed to be of a ring-like shape so as to be expandable up to a size which allows a wrist 14 of the robot 2 to pass therethrough and be contractable up to a size which is shorter than a size of the outer circumference of the forearm 5.

Figure 6:
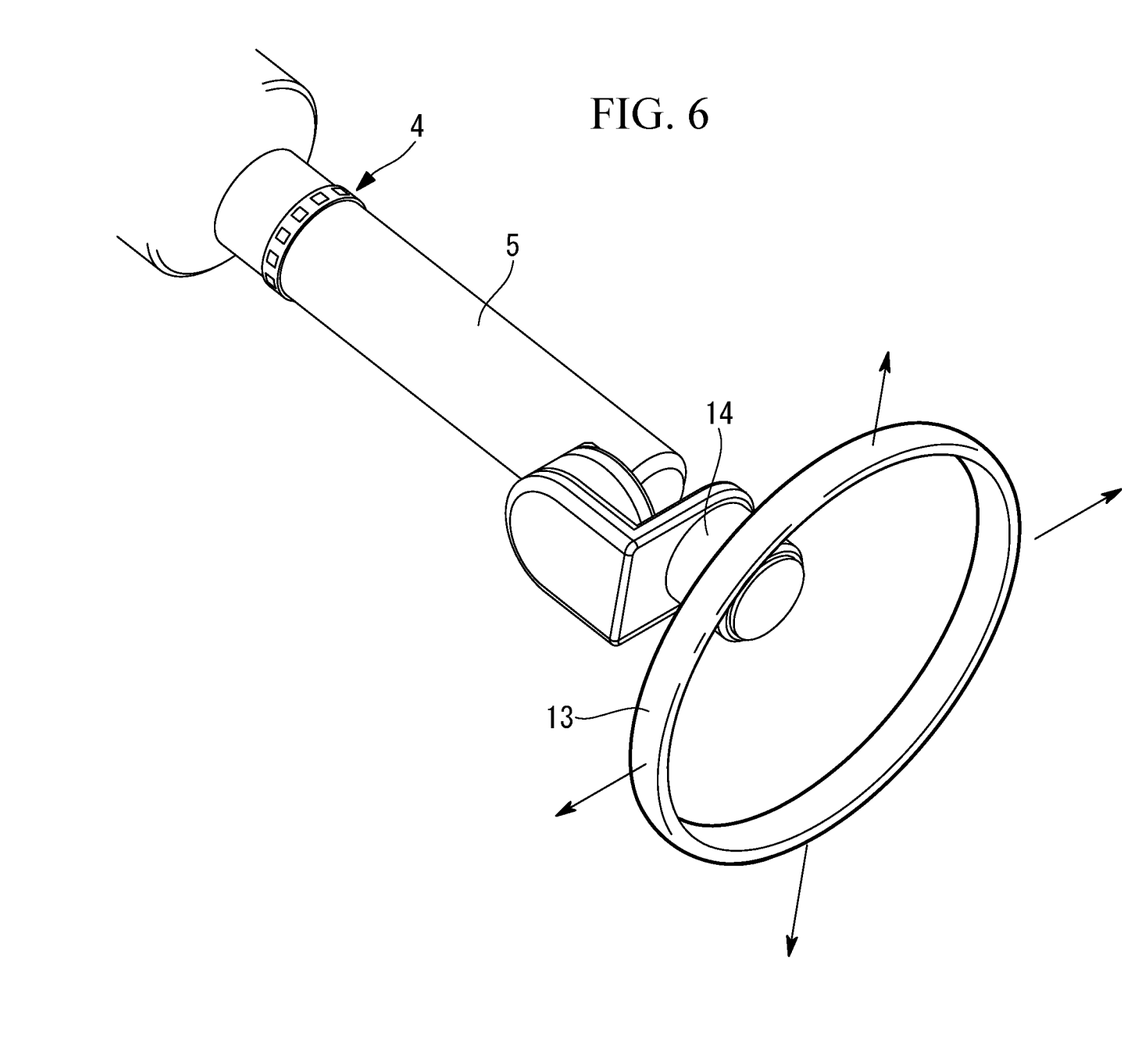
FIG. 6 is a partial perspective view illustrating work for expanding a modified example of a fixture for fixing the display device shown in FIG. 2 and for attaching the fixture on the forearm of the robot.
Figure 7:
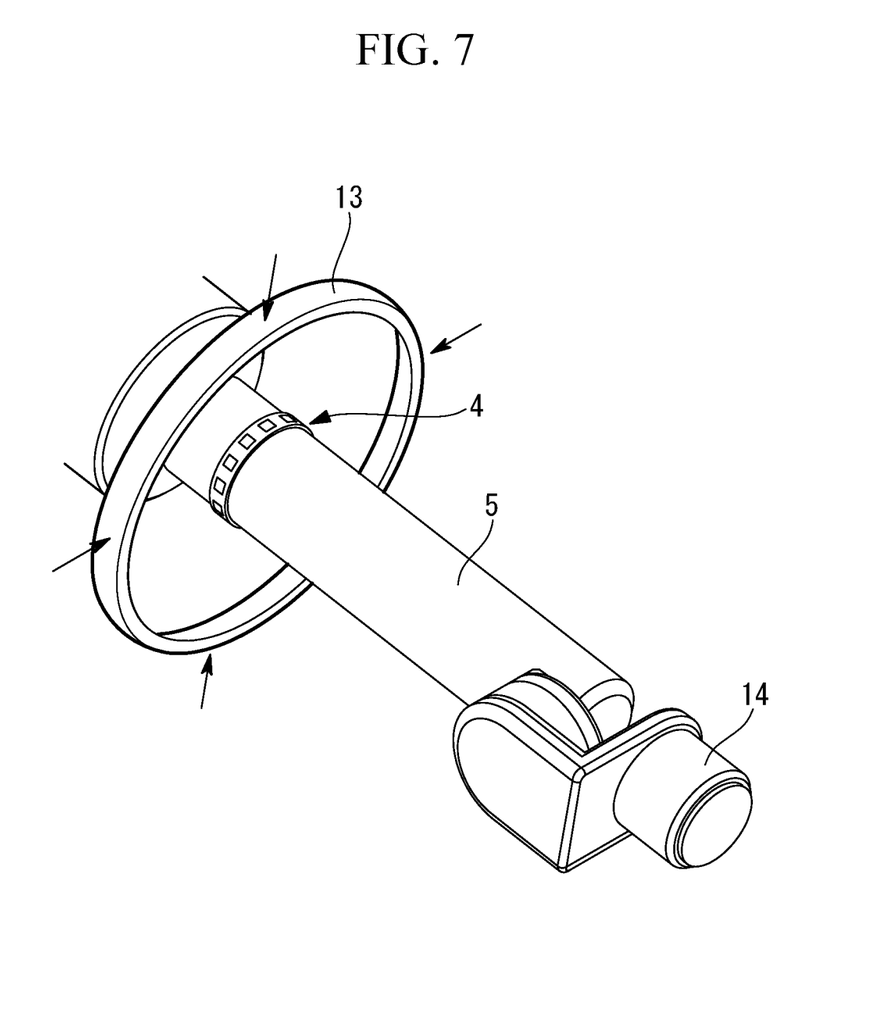
FIG. 7 is a partial perspective view illustrating operation in which the fixture shown in FIG. 6 is contracted and the display device is covered.
Figure 8:
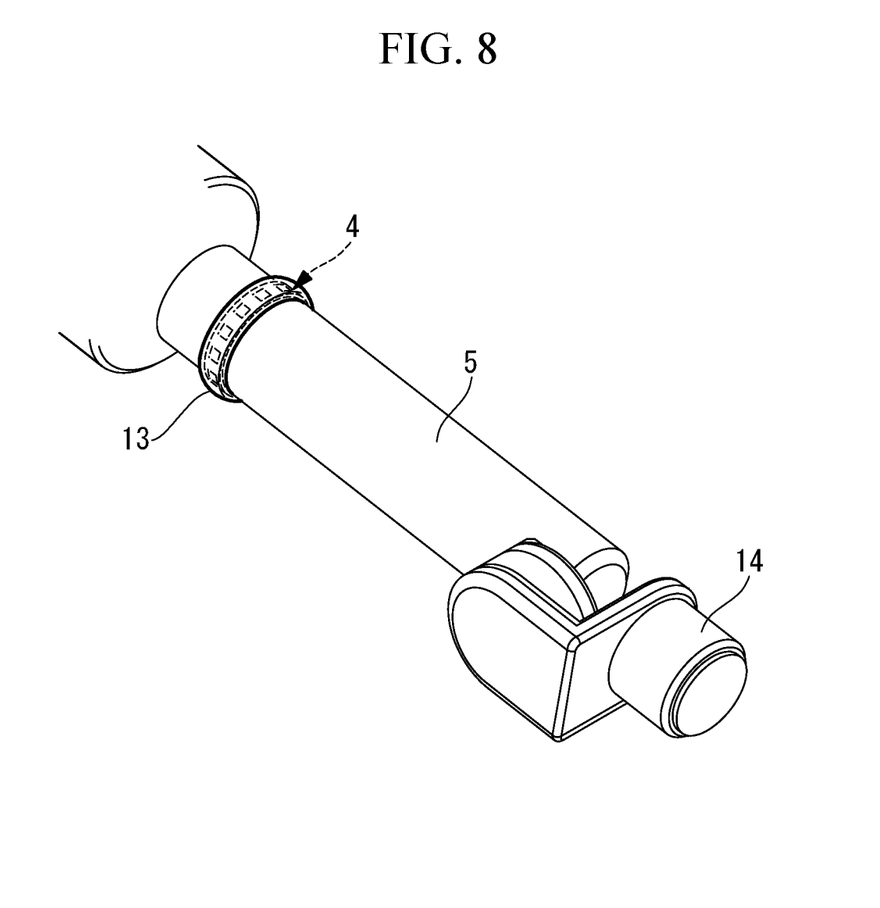
FIG. 8 is a partial perspective view showing a state in which the display device is covered by the fixture shown in FIG. 7 and is attached on the forearm of the robot.

When the display device 4 is fixed on the forearm 5 of the robot 2, with the base part 6 curved and wound on the forearm 5, as shown in FIG. 6, a force is exerted in a direction in which the cover 13 is expanded to expand up to a size which allows the wrist 14 can pass therethrough, and as shown in FIG. 7, the wrist 14 of the robot 2 is caused to pass therethrough and the force exerted on the cover 13 is released in a position in which the base part 6 of the display device 4 is covered, whereby as shown in FIG. 8, the cover 13 is contracted by an elastic restoring force, and the base part 6 is pressed onto the outer surface of the forearm 5 and can be fixed thereon. Thus, the display device 4 covered by the cover 13 is held in a state in which the display device 4 is attached on the outer surface of the forearm 5.

In addition, by attaching the cover 13 thereon, sharp changes in protruding and recessed shapes can be lowered, and comparatively smooth protruding and recessed shapes can be formed. This allows a risk that also when this portion contacts a person, the person is injured at an edge portion to be further reduced. In addition, the cover 13 has an effect to protect the display device 4 from collision with peripheral devices. Even if the cover 13 collides with the peripheral devices and is damaged, only the cover 13 can be easily replaced.

Figure 9:
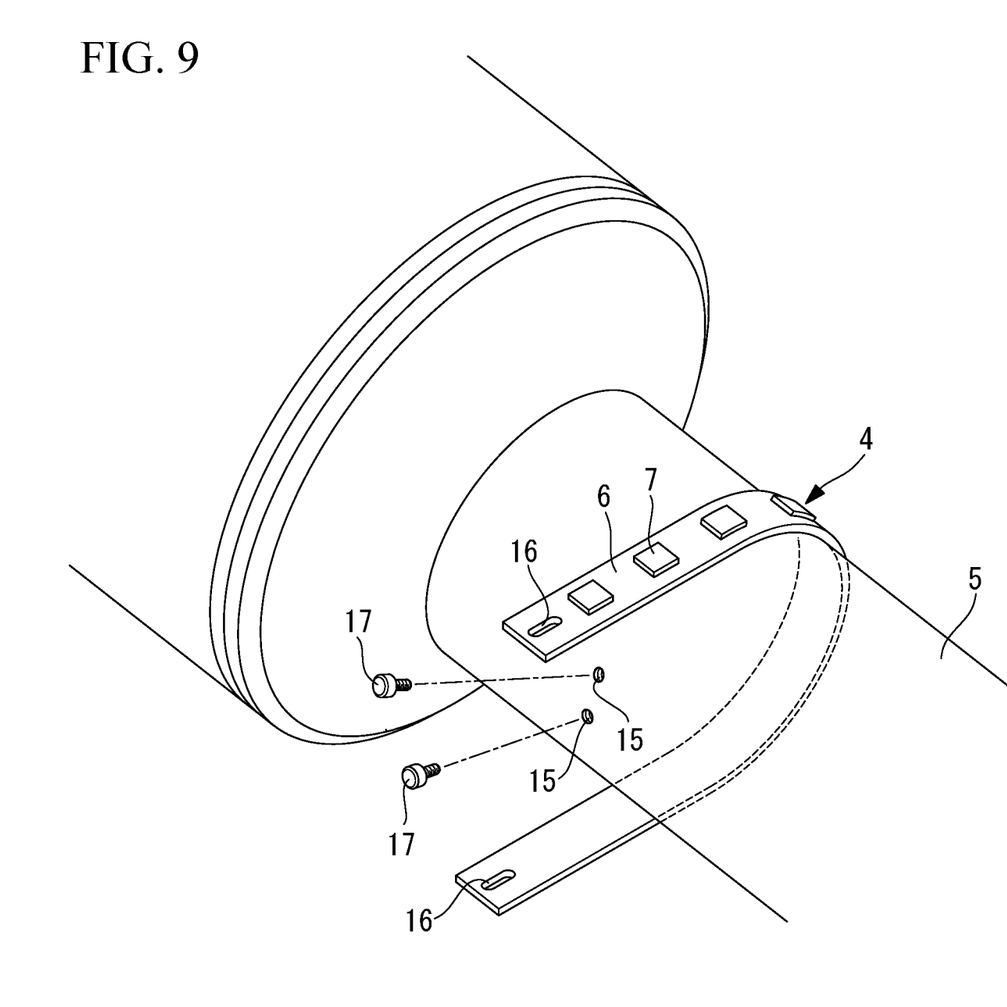
FIG. 9 is a partial perspective view showing a modified example of the display device and a modified example of the fixture shown in FIG. 2.

In addition, as shown in FIG. 9, by providing one or more screw holes 15 in the outer surface of the forearm 5 or the like of the robot 2 and providing through-holes 16 in the base part 6 of the display device 4, screws 17 which are fastened into the screw holes 15 may be adopted as a fixture.

Figure 10:
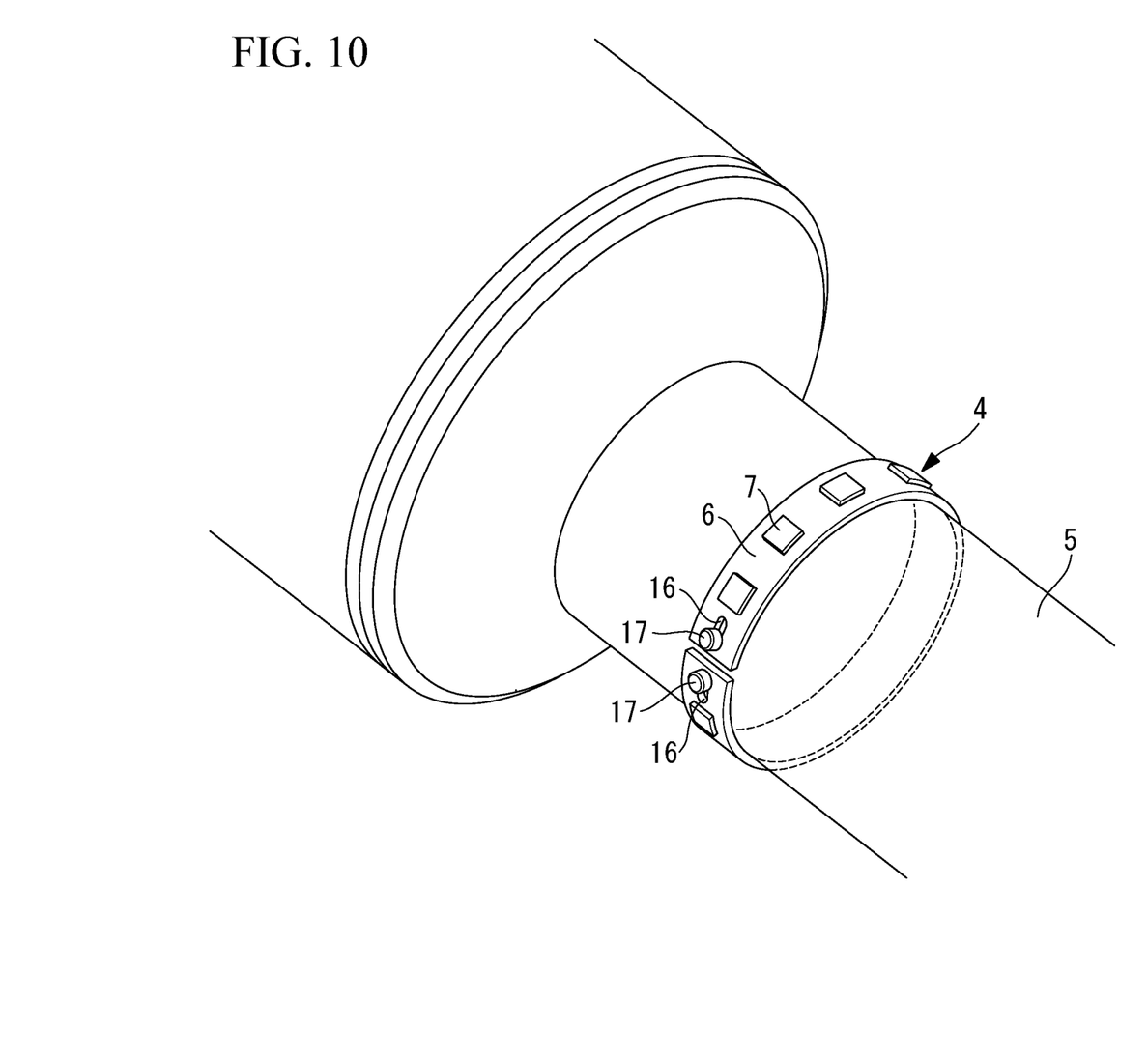
FIG. 10 is a partial perspective view showing a state in which the display device shown in FIG. 9 is fixed on the forearm of the robot.

That is, as shown in FIG. 10, the screws 17 which are passed through the through-holes 16 of the base part 6 are fastened into the screw holes 15, thereby allowing the display device 4 to be easily and surely fixed on the outer surface of the robot 2.

In addition, both of the base part 6 and the cover 12 shown in FIG. 5 are provided with the through-holes 16 and the screws 17 are jointly fastened into the through-holes 16 and the screw holes 15 of the outer surface of the robot 2, thereby allowing the display device 4 to be fixed.

Although when the screws 17 are adopted, machining the screw holes 15 in the outer surface of the robot 2 is needed, minimum machining is sufficient, and the effects similar to the aforementioned effects can be exhibited.

Figure 11:
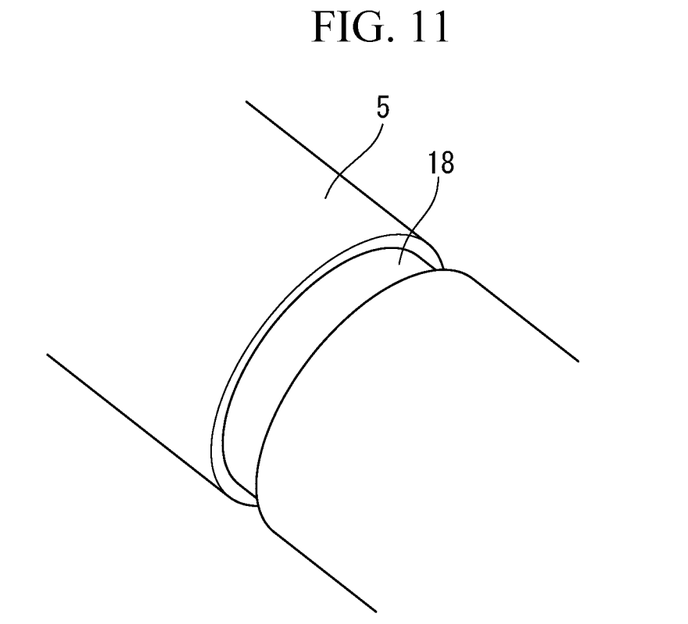
FIG. 11 is a partial perspective view showing a groove made in an outer surface of the robot on which the display device shown in FIG. 1 is attached.
Figure 12:
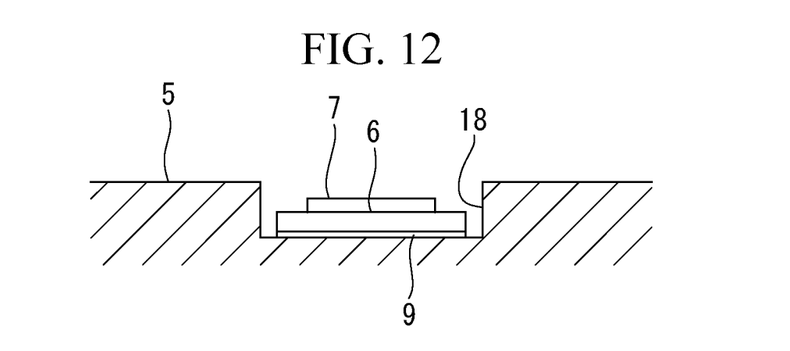
FIG. 12 is a partial longitudinal sectional view showing a state in which the display device is attached in the groove shown in FIG. 11.
Figure 13:
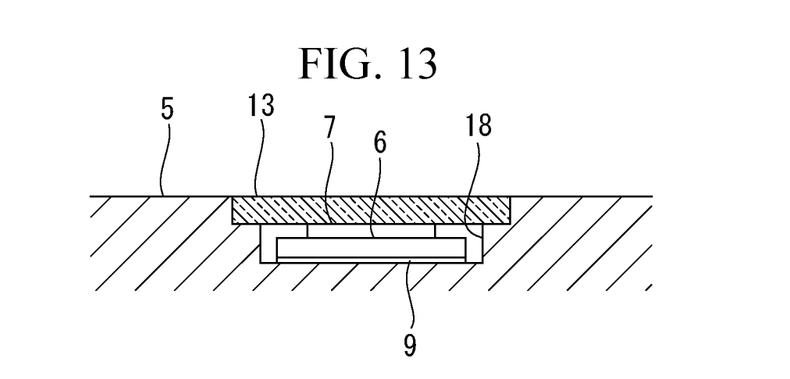
FIG. 13 is a partial longitudinal sectional view illustrating a case in which the display device shown in FIG. 12 is covered by a cover.

In addition, as shown in FIG. 11, a groove (recessed part) 18 having a size which allows the base part 6 to be housed may be provided in the outer surface of the robot 2 on which the display device 4 is attached. Thus, as shown in FIG. 12, the attached display device 4 is not required to be largely protruded from the outer surface of the robot 2, thereby allowing chances of contacting of the LED light sources 7 with an external object to be reduced and enabling the display device 4 to be maintained in a sound condition. As shown in FIG. 13, a cover 13 formed of the elastic material and covering the LED light sources 7 may be further provided, thereby protecting the LED light sources 7.

In addition, in the present embodiment, the LED light sources 7 are used as the light emitting parts. However, any other light sources may be adopted as the LED light sources 7. In addition, the light sources which are operable to emit light in the plurality of colors are adopted. However, light sources which are operable to emit light in a single color may be adopted. In this case, operation modes may be discerned by operation patterns of the LED light sources 7, the operation patterns being different from one another. In addition, a plurality of display devices 4, each of which is operable to emit light in a single color and which are operable to emit light in colors which are different from one another, may be arranged to be fixed.

In addition, it is preferable that the wiring of the cable 10 for supplying the electric power to the display device 4 pass through the inner space of the robot 2 to avoid contacting the peripheral devices.

In addition, as the robot 2 in the present embodiment, a forearm 5 of a standard industrial robot, which is not the collaborative robot, is provided with holes for wiring of a cable 10 from the beginning, and the wiring of the cable 10 is caused to pass through the holes, whereby the aforementioned robot may be adopted as the collaborative robot.

In addition, it is preferable that upon shipping of the robot 2, the display device 4 with which the robot 2 is accompanied is shipped, and after the delivery to a user, the user can select a portion on which the display device 4 is wound, such as the outer surface of the forearm 5 of the robot 2.

In addition, although the collaborative robot is illustrated as an example, the present invention is not limited thereto, and any other robot may be adopted. In addition, as the robot 2 in the present embodiment, the display device 4 may be added to a standard industrial robot which is not the collaborative robot, and the robot may be modified into the collaborative robot.

In addition, although in the present embodiment, the example in which the LED light sources 7 are used as the display parts is illustrated, instead of this, any display part such as a liquid crystal display part or a loudspeaker may be adopted.

In addition, the cover 12 shown in FIG. 5 and the cover 13 shown in FIG. 7 are not covers used only when the display parts are the LED light sources 7 which are the light emitting parts, and the cover 12 and the cover 13 may be adopted for any display part such as the liquid crystal display part or the loudspeaker.

In addition, the colors and the lighting-up and lighting-off patterns of the LED light sources 7 are not necessarily limited to the above-described colors and patterns, and a variety of colors may be adopted.

From the above-described embodiment, the following invention is derived.

One aspect of the present invention is a robot system which includes: a robot; a controller controlling the robot and causing the robot to operate in a plurality of operation modes; and a display device attached on the robot and caused to operate in patterns in accordance with the operation modes by the controller, the patterns being different from one another. In the robot system, the display device includes: a sheet-like base part being deformable in a shape in accordance with an outer surface of the robot and having flexibility; one or more display parts fixed on the base part; and a fixture maintaining the base part in a state in which the base part is attached on the outer surface of the robot.

According to the present aspect, when the robot is operated in predetermined operation modes by the controller, the controller causes the display device to operate in patterns in accordance with the operation modes of the robot. Since the display device is arranged on the outer surface of the robot, a worker can recognize the operation modes of the robot by the operation patterns of the display device from outside the robot.

In this case, the base part is deformed in the shape in accordance with the outer surface of the robot, thereby maintaining the display device by the fixture in the state in which the display device is attached on the outer surface thereof. Accordingly, exclusive designing for attaching the display device is minimized and cost can be reduced. In addition, the display device can be accessed from outside the robot, thereby allowing maintainability to be enhanced. In addition, if the display device is integrated with an arm of the robot, since upon the replacement of the display device, it is required to disassemble the arm, maintenance is made difficult. In the present invention, although the maintainability is facilitated, upon assembling, a process for the arm in which the base part is attached on the outer surface of the arm is required.

In the aforementioned aspect, the display parts may include light emitting parts.

In addition, in the aforementioned aspect, the base part may be of a long tape-shape.

By this configuration, the display device can be wound on an outer surface of any of a body, the arm, an end effector, or the like of the robot.

In addition, in the aforementioned aspect, the light emitting parts may be fixed in a longitudinal direction of the base part so as to be spaced apart from one another.

By this configuration, when the display device is wound on the outer surface of any of the body, the arm, the end effector, or the like of the robot, light can be emitted in a plurality of directions from the light emitting parts, and a range in which a worker around the robot can visually recognize display contents can be widened.

In addition, in the aforementioned aspect, the robot system may include a cover covering the light emitting parts, transmitting light emitted from the light emitting parts, and being formed of a material having flexibility.

By this configuration, the light emitting parts can be protected by the cover. In addition, by attaching the cover thereon, sharp changes in protruding and recessed shapes can be lowered, and comparatively smooth protruding and recessed shapes can be formed. This allows a risk that also when this portion contacts a person, the person is injured at an edge portion to be further reduced. In addition, the cover has an effect to protect the display device from collision with peripheral devices. Even if the cover collides with the peripheral devices and is damaged, only the cover can be easily replaced.

In addition, in the aforementioned aspect, the cover may be formed of a material guiding the light emitted from the light emitting parts while scattering the light and extend along the longitudinal direction of the base part.

By this configuration, since the light emitted from the light emitting parts are scattered while the light is guided inside the cover, even when the number of the light emitting parts is small, the display contents can be visually recognized from a wide range around the robot.

In addition, in the aforementioned aspect, the robot may include an arm, and the base part may be wound over whole circumference of the arm.

By this configuration, regardless of a posture of the arm, display contents can be visually recognized from the wide range around the robot. In this case, a process of winding the base part on the arm is required.

In addition, in the aforementioned aspect, the robot system may include a cable electrically connecting the display device and the controller, and the cable may include a connector adjacent to the display parts, the connector separably connecting the cable.

By this configuration, when failure has occurred on the display device, only a portion at an end side can be replaced from the connector, thereby allowing the maintenance to be facilitated.

In addition, in the aforementioned aspect, the fixture may be arranged in a position in which the light emitting parts are covered, may be a cover formed of an elastic material which transmits light emitted from the light emitting parts, and may fix the base part on the outer surface of the robot by an elastic force.

By this configuration, the base part is deformed in the shape in accordance with the outer surface of the robot and the cover for covering the light emitting parts is arranged, thereby allowing the base part to be easily fixed on the outer surface thereof by the elastic force of the cover. In addition, merely by exerting a force in a direction in which the cover is detached, the base part can be detached from the outer surface thereof, thereby enabling easy attachment and detachment.

In addition, in the aforementioned aspect, the robot may include an arm having a wrist at an end of the arm, the base part may be wound along a circumferential direction of the arm, and the cover may be formed to be of a ring-like shape so as to be expandable up to a size which allows the wrist to pass through the cover and be contractable up to a size which is shorter than a size of outer circumference of the arm.

By this configuration, a force is exerted in a direction in which the cover which is of the ring-like shape is expanded, the wrist is passed through the cover, the cover is arranged so as to cover the light emitting parts from outside in a radial direction of the base part wound in the circumferential direction of the arm, and the force is released, thereby allowing the cover to be contracted by an elastic restoring force. Thus, the base part is pressed to the outer surface of the arm by the elastic force of the cover and is easily fixed thereon. In addition, in this case, a process in which the cover is expanded up to the size which allows the wrist to pass therethrough and a process in which the wrist is passed through the cover, and a process in which the cover is contracted by the elastic restoring force to be fixed on the outer surface of the arm are required.

In addition, in the aforementioned aspect, the display parts may include LEDs, each of which is operable to emit light in a single color.

By this configuration, a plurality of operation modes can be displayed by making light emitting patterns of the display parts different from one another.

In addition, in the aforementioned aspect, the display parts may include LEDs, each of which is operable to emit light in a plurality of colors.

By this configuration, in addition to the light emitting patterns of the display parts, by combining the colors, further many operation modes can be displayed.

In addition, in the aforementioned aspect, the robot may include a screw hole in the outer surface of the robot, the fixture may include a screw adaptable to be fastened into the screw hole, and the base part may be provided with a through-hole adaptable to pass the screw through the through-hole.

By this configuration, since the screw hole as a minimum configuration for attaching the display device is merely machined, the cost can be reduced. The screw passed through the through-hole provided in the base part is fastened into the screw hole, thereby allowing the base part to be surely fixed on the outer surface of the robot.

In addition, in the aforementioned aspect, the robot may include, in the outer surface of the robot, a recessed part adaptable to house the base part.

By this configuration, the base part is housed inside the recessed part, thereby allowing protrusion of the light emitting parts from the outer surface to be reduced.

In addition, in the aforementioned aspect, the fixture may be arranged between the base part and the outer surface of the robot and be an adhesive material adhesively attaching the base part on the outer surface thereof.

By this configuration, the base part can be adhesively attached on the outer surface of the robot by an adhesive force of the adhesive material, thereby allowing the base part to be easily fixed thereon.

REFERENCE SIGNS LIST 1 robot system
2 robot
3 controller
4 display device
5 forearm (arm)
6 base part
7 LED light sources (LEDs, light emitting parts, or display parts)

8 connector
9 adhesive tape (adhesive material or fixture)
10 cable
12 cover
13 cover (fixture)
14 wrist
15 screw holes
16 through-holes
17 screws (fixture)
18 groove (recessed part)

The invention claimed is:

1. A robot system comprising:
a robot;
a controller controlling the robot and causing the robot to operate in a plurality of operation modes;
a display device that is caused to operate in accordance with the operation modes by the controller; and
a cover that is formed so as to transmit light,
wherein the robot comprises a fixing part which is provided at a position recessed from an outer surface of the robot along the outer surface of the robot,
wherein the display device comprises:
a tape-shaped base part that is fixed to the fixing part; and
one or more light emitting parts provided on the base part so as to be protruded from the base part,
wherein the cover is removably disposed at a position at which the cover covers an entirety of the display device so that the cover lies flush with the outer surface of the robot, and
wherein after the base part is fixed to the fixing part, the cover is configured to cover the display device and to be detached therefrom for maintenance of the display device.

2. The robot system according to claim 1, wherein the light emitting parts are fixed in a longitudinal direction of the base part so as to be spaced apart from one another.

3. The robot system according to claim 1, wherein the robot includes an arm, and
the fixing part is provided along a whole circumference of the outer surface of the arm.

4. The robot system according to claim 1, further comprising a cable electrically connecting the display device and the controller, wherein
the cable includes a connector adjacent to the light emitting parts, the connector separably connecting the cable.

5. The robot system according to claim 1, wherein the cover is formed of an elastic material, and
wherein the base part is fixed to the fixing part via an elastic force of the cover.

6. The robot system according to claim 5, wherein
the robot comprises an arm having a wrist at an end of the arm,
the fixing part is provided along a whole circumference of the outer surface of the arm, and
the cover is formed to be of a ring-like shape so as to be expandable up to a size which allows the wrist to pass through the cover and be contractable up to a size which is shorter than a size of outer circumference of the arm.

7. The robot system according to claim 1, wherein the light emitting parts comprise LEDs, each of which is operable to emit light in a single color.

8. The robot system according to claim 1, wherein the light emitting parts comprise LEDs, each of which is operable to emit light in a plurality of colors.

9. The robot system according to claim 1, wherein the base part display device is fixed to the fixing part via a screw.

10. The robot system according to claim 1, wherein the base part is fixed to the fixing part via an adhesive material.

11. The robot system according to claim 1, wherein the cover covers the light emitting parts and is formed of a flexible material that transmits the light emitted from the light emitting parts.

12. The robot system according to claim 1, wherein at least a part of the cover is formed of a material which both guides and scatters the light emitted from the light emitting parts.

* * * * *